Apr. 10, 1923.
K. SCHEMBER ET AL
1,451,118
ELECTRIC STEELYARD WEIGHING MACHINE
Filed Oct. 21, 1920
4 sheets-sheet 2
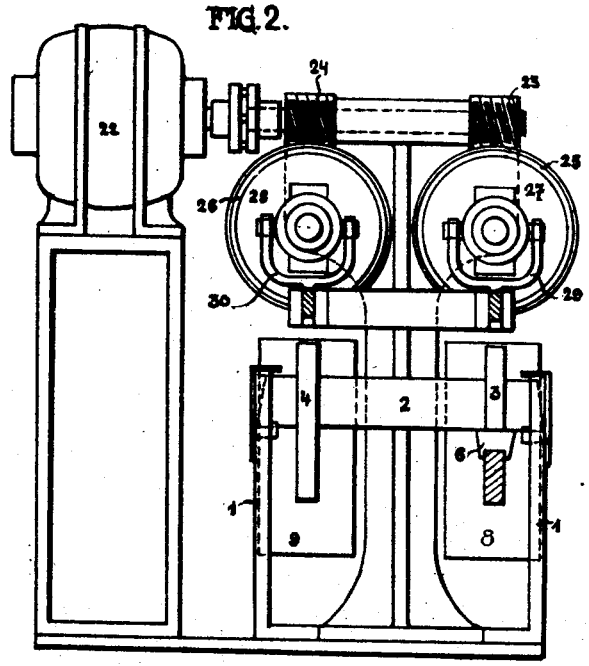
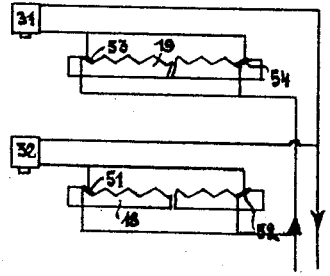
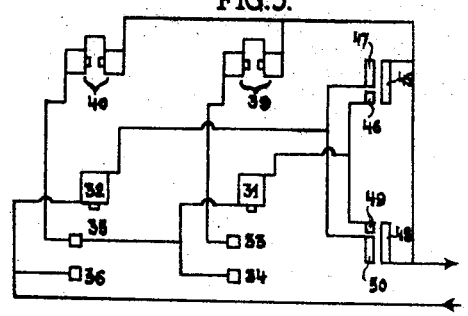
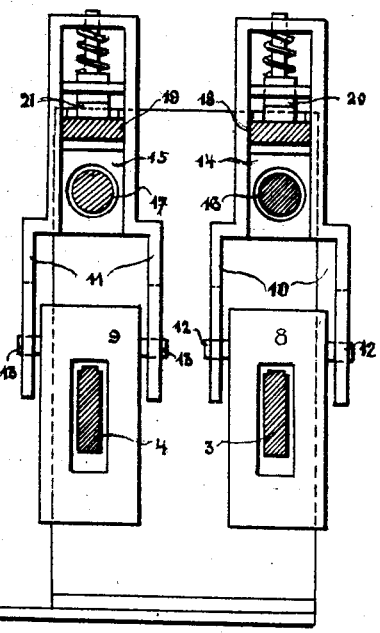

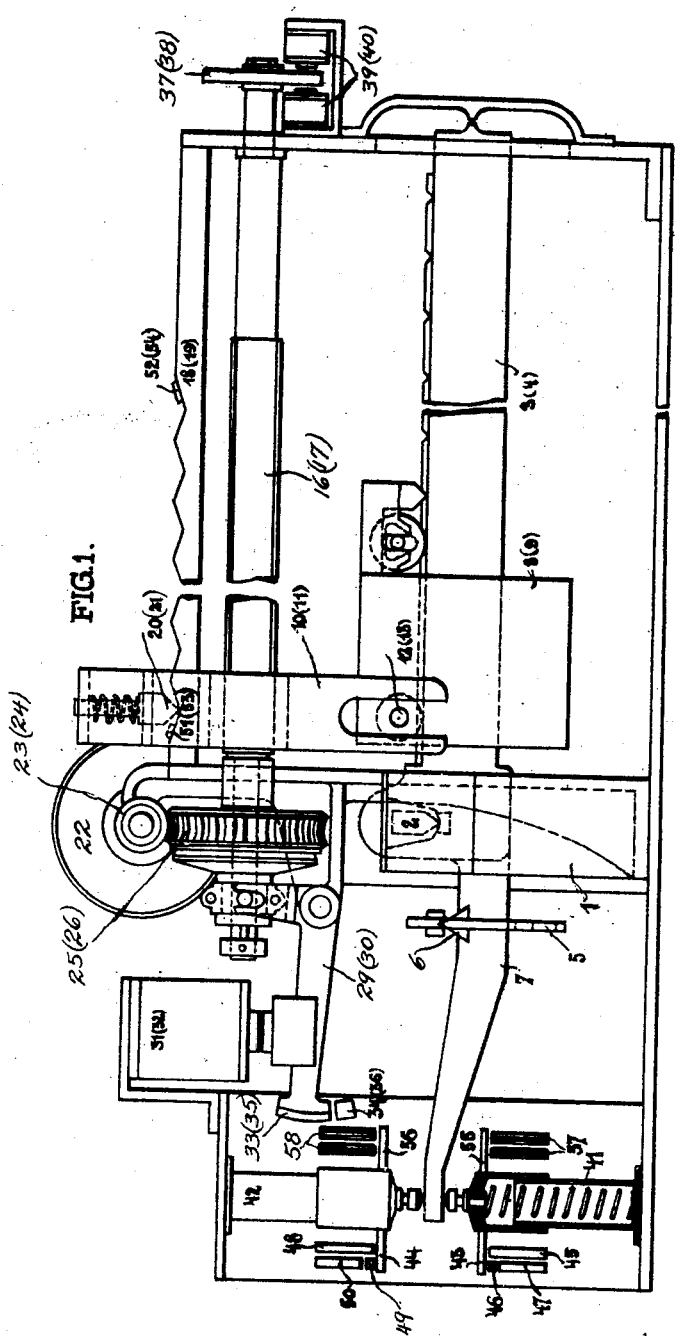

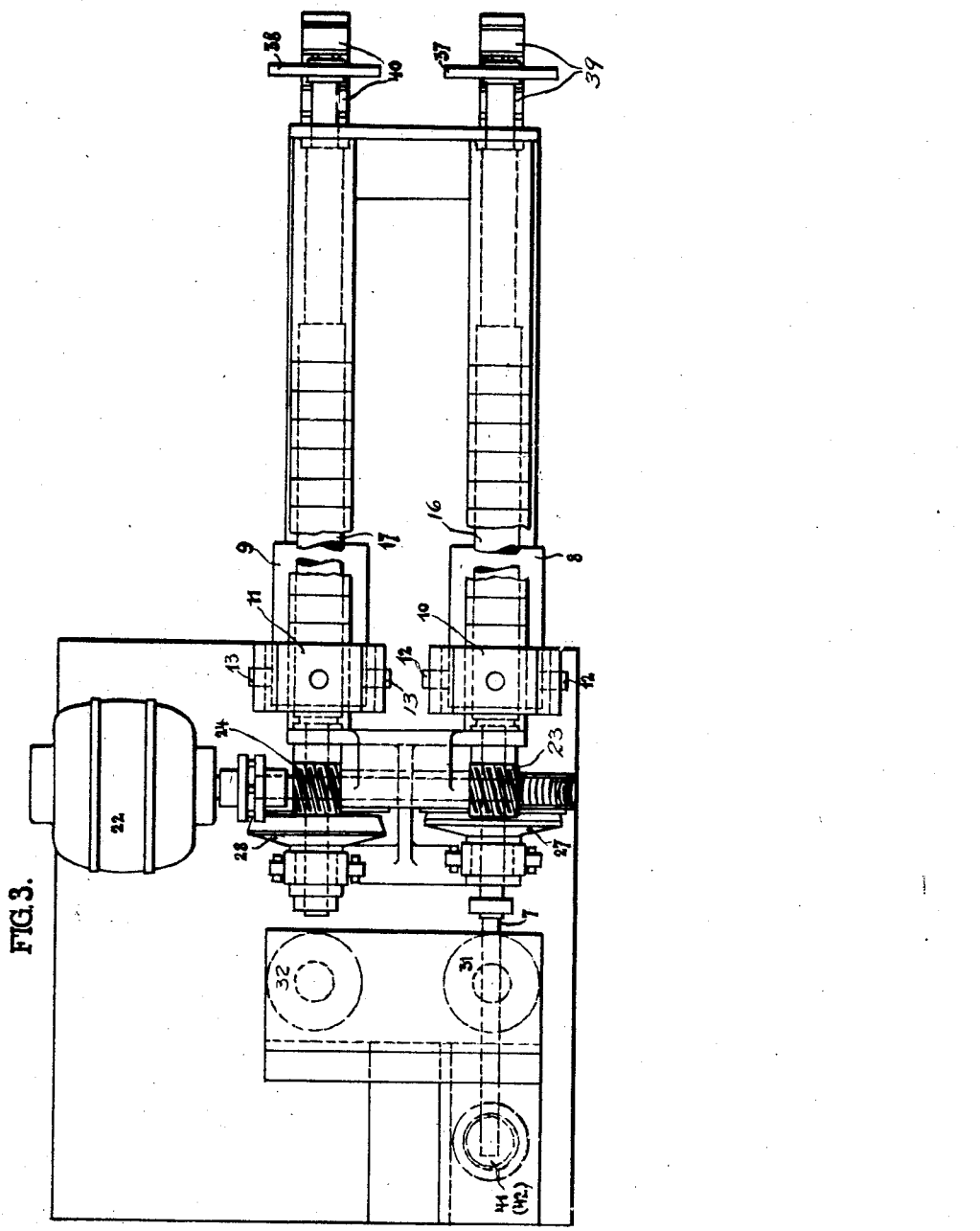

Apr. 10, 1923.

K. SCHEMBER ET AL 1,451,118

ELECTRIC STEELYARD WEIGHING MACHINE

Filed Oct. 21, 1920

4 sheets-sheet 4

Inventors.
Kornelius Schember
and Rudolf Joksch
By [signature]
Atty

Patented Apr. 10, 1923.

1,451,118

UNITED STATES PATENT OFFICE.

KORNELIUS SCHEMBER, OF ATZGERSDORF, NEAR VIENNA, AUSTRIA, AND RUDOLF JOKSCH, OF PRAGUE, KAROLINENTHAL, CZECHOSLOVAKIA.

ELECTRIC STEELYARD WEIGHING MACHINE.

Application filed October 21, 1920. Serial No. 418,599.

*To all whom it may concern:*

Be it known that we, KORNELIUS SCHEMBER, manufacturer, a citizen of the Republic of Austria, and residing at Atzgersdorf, near Vienna, in the Republic of Austria, and RUDOLF JOKSCH, a citizen of the Republic of Czechoslovakia, and residing at Prague, Karolinenthal, in the Republic of Czechoslovakia, have invented certain new and useful Improvements in an Electric Steelyard Weighing Machine, of which the following is a specification.

Our invention relates to that kind of automatic travelling poise devices, wherein two or more steelyards are simultaneously acted upon by the same load and the travelling poises of which are adjusted by a single motor which is thus common for both. The scales of the several steelyards begin from 0 and are so graduated according to different unit values which are subdivisions of one another, that each steelyard has its definite range of weighing. In accordance with the magnitude of the load on the weighing machine, in the weighing the travelling poise belonging to one weight-graduation is first adjusted. If the range of weighing of this steelyard is not sufficient for weighing the load, the travelling poises of the other series are successively adjusted automatically until balance is obtained. According to our present invention, the automatic rough and fine weighing is effected by a pressure controlling device which automatically controls the electric circuits for moving the several travelling poises in accordance with the magnitude of the load, the said controlling device being inoperative in the position of equilibrium.

Figure 7:
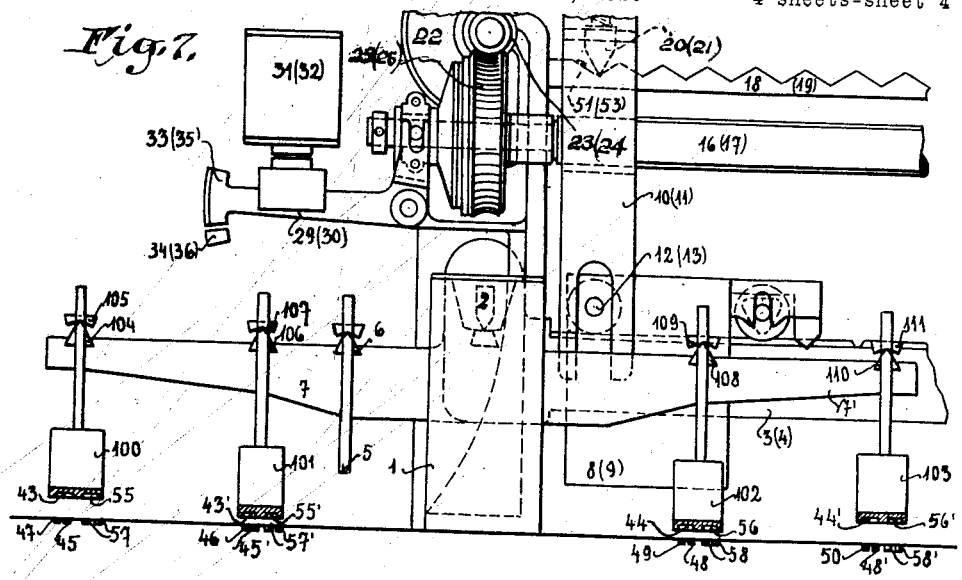
Figure 8:
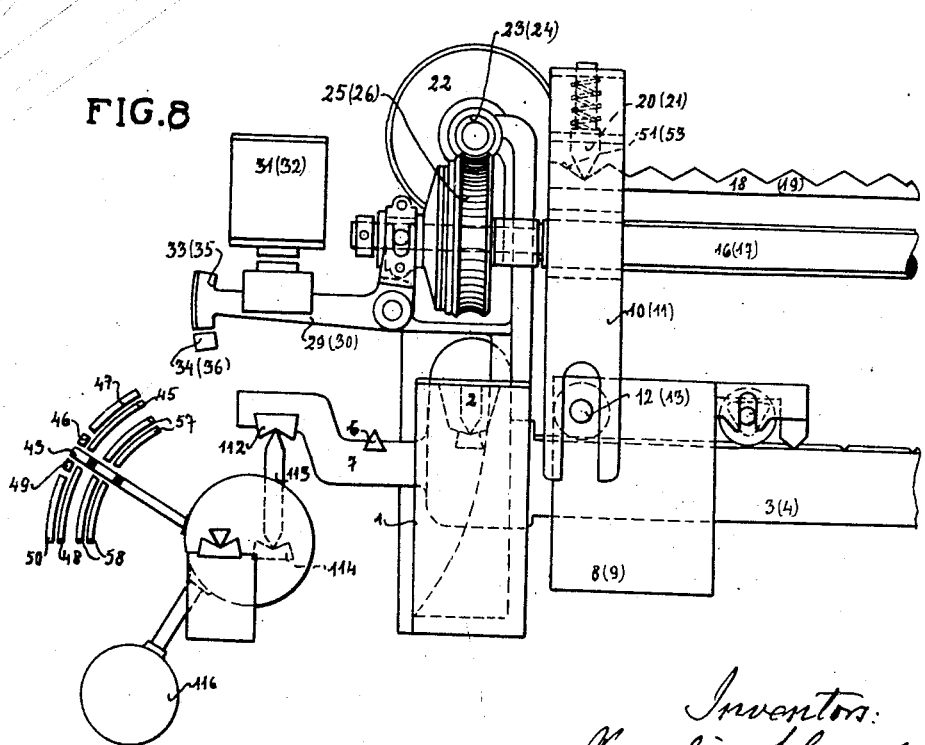

One constructional form of our invention is shown by way of example in Figures 1 to 4 of the drawing, Fig. 1 being a side elevation, a portion of the machine being broken away, Fig. 2 an end view, Fig. 3 a top view and Fig. 4 a transverse sectional view, whilst Figures 5 and 6 are diagrams of the electric connections. Figs. 7 and 8 are similar views as Fig. 1 showing modifications.

In the bearings in the weighing machine frame 1, there is mounted the common axis 2 of the steelyards 3 and 4. The load acting directly or through a system of levers such as are usual in weighbridges, engages on the load suspension rod 5 of the load knife-edges 6, which is on the load arm 7 of the steelyard 3. All loads acting on the suspension rod 5 consequently act alike on the whole system of the steelyards 3 and 4. The two steelyards can be graduated in relation to each other in decimals or according to any other desired system, so that for example the steelyard 3 weighs the units, and the steelyard 4 the tens of the value of the weight of the load applied and each of the two steelyards is graduated accordingly. Also the weights of the travelling poise 8 adjustable on the steelyard 3 and that of the travelling poise 9 on the steelyard 4 are arranged according to the weight-value of the corresponding steelyard. In this manner the steelyard 3 is supplementary to the steelyard 4, since after the rough weighing made by the steelyard 4 there follows the fine weighing made by the steelyard 3. The adjustment of the travelling poises 8 and 9 takes place by means of devices 10 and 11 respectively, the forked lower end of which grasps with a suitable amount of play the pins 12, 13 respectively projecting from the poises. The devices 10 and 11 are fixed to a screw-nut 14, 15 respectively, Figure 4, which is mounted on the screw spindle 16, 17 respectively and has an axial movement, as soon as the spindle is turned. The travelling poises 8 and 9 are provided with automatic notch-adjustment as described in the specification of our former application for Letters Patent Ser. No. 387,769. The travelling poise 8 or 9 is thus brought by its adjusting device 10 or 11, without interfering with the free movement of the steelyards, into the neighborhood of the scale-notch in the steelyard corresponding to the position of balance, whereupon the poise is released by its adjusting device and by reason of its own weight or by the action of a spring is seated automatically into the corresponding notch. The screw spindle 16 or 17 and the notched bar 18 or 19 above it are supported or fixed on the frame of the weighing machine. Each adjusting device bears at its upper end a tooth 20 or 21, which by means of a compression spring tends continually to fall into the notches of the bar 18 or 19, and on the other hand can slide over the projections between the notches, as soon as the adjusting device is moved by the turning of the screw spindles.

The driving of the screw spindles 16 and 17 takes place by means of an electromotor 22 by means of the worms 23 and 24 respectively, which engage in the worm-wheels 25 and 26 mounted loosely on the screw spindles 16 and 17 respectively. The rotation of the worm-wheels is transmitted to the screw spindles as soon as the cone clutch-members 27 and 28, which are mounted so as to slide axially on feathers on the screw spindles, Figure 3, are respectively thrown into engagement with the worm wheels 25 and 26, which are shaped accordingly, by means of actuating forks 29 and 30 made in the form of bell-crank levers. This takes place as soon as the electromagnet 31 or 32 is energized. When the electromagnet 31 or 32 is de-energized, the armature which is made in the form of a tumbler weight arranged on the actuating lever 29 or 30, causes the corresponding clutch member 27 or 28 to be drawn out of engagement with the worm-wheel 25 or 26 and the latter wheels turn without taking with them the screw-spindles 16 and 17 respectively. The actuating levers 29 and 30 are formed at the ends of their horizontal arms as switch-members and slide on the contact-points 33, 34 and 35, 36 respectively, in such a manner that in their highest position, when the cone clutch is in its engaged position, they maintain interrupted the connection between 33 and 34 or between 35 and 36; on the other hand when in their lowest position with the cone coupling out of engagement, they connect the contact points 33 and 34, or 35 and 36. The threads of the screw spindles 16 and 17 are multiple threads and have a pitch, which is of the same magnitude as the distance a part of the notches on the notched bar 18 or 19 and as the similarly spaced scale-notches on the steelyards 3 and 4. One revolution of the screw spindle therefore corresponds to the movement of the adjusting device belonging thereto and thus also of the travelling poise thereof through one space of the corresponding notches. In order to obtain each time, a whole revolution of the screw spindles i. e. in order to obtain exact adjustment of the spring-controlled tooth 20 or 21 of the adjusting device 10 or 11 into a notch of the notched bar 18 or 19, there is keyed at the right hand end of each screw spindle a disc 37 and 38 of non-magnetic material, which rotates between two magnets 39 and 40 respectively and contains an iron armature which is attracted in the field between the magnet poles. By this means the exact adjustment of the adjusting device is ensured and braking of the rotating screw spindles at the desired moment is effected.

The control of the electric circuits of the magnets 31, 32 and 39, 40 is as follows; viz: These magnets are energized alternately, i. e. so long as the magnet 31 or 32 is energized, the contact points 33 and 34 or 35 and 36, are an open circuit and the magnet 39 or 40 is de-energized. On the other hand the magnet 39 or 40 is excited when the circuit of the magnet 31 or 32 is interrupted and by this means the contact points 33 and 34, or 35 and 36 are connected.

In order to control the motion-mechanism for the travelling poises, there are employed the two so-called selectors 41 and 42 which in the form given by way of example in the drawing are shown as ordinary spring balances.

The selector can also be provided on the steelyard itself in the form of suspension weights, or can be constructed with at least one inclination scale. Fig. 7 shows the embodiment of such a scale as would be suitable for the use of suspension weights. The weighing beam 7 according to this construction is prolonged toward the left, and toward the right it is formed as a weighing arm $7^1$. On this weighing beam the knife-edges 104, 106, 108 and 110 are arranged symmetrically relative to the axis 2. They serve for the reception of cups of the suspension weights 100, 101, 102 and 103. These are so shaped that they can seat themselves successively onto a support thus becoming disengaged from the weighing beam. On their seating faces they are provided with insulated small contact plates adapted to bridge over contacts, whereby circuits corresponding to the diagram in Fig. 5 are closed. The two outer weights 100, 103 correspond to a load of $(n-1)c$ units, wherein $n$ represents the number of notches in the weighing beam, carrying the small travelling poises (in this case 1 kg.) while $c$ represents the smallest load represented by this travelling poise. The two inner suspension weights 101 and 102 correspond to $c$ units.

When the load attacking at the knife-edge 6 pulls the weighing beam 7 down, first the weight 101 will become seated, then, when the load is sufficiently great, the weight 100. Thus there are lifted from the weighing beam 7 $(n-1)c+c=nc$ units. This is equal to the weight, to which correspond the heavy travelling poise. Therefore, also in this instance, the weight is adjusted for tare as long as the weight rests on its support. When this weight is lifted off and suspended from the weighing beam, while the weight 101 still rests on its support, only $c$ units are still adjusted for tare corresponding to the first stop of the spring scale. The function of the weights 102 and 103 is analogous, corresponding to the second spring scale in Fig. 1.

Fig. 8 shows an embodiment, wherein a pendulum scale functions as the selector in such a way that the position of equilibrium of the scale as shown, has been so adjusted that the pendulum weight 116 of the selector 115 deviates from the perpendicular under an angle X (about 30°). Over the cups 114, 112 and the bar 113 the pressure of the scale is transmitted to the weighing beam 7. The positions of the pendulum weight at an angle of deviation smaller than X act as negative weights on the weighing beam; whereby the above spring balance of Figure 1 is replaced, whereas the positions of the pendulum with an angle of deviation greater than X act positively on the weighing beam, therefore replacing the lower spring balance of Fig. 1. The contact arm 55 rigidly connected with the inclination scale effects the required electric connections.

From Figs. 7 and 8 the connections as shown in the diagram of Fig. 5 will be readily understood, and the explanations given above in connection with the spring-balance equally apply to the constructions according to Figs. 7 and 8. Between the adjustable stops of the two selectors there is arranged the end of the load arm 7 of the steelyard 3 in such a manner that it does not touch the stops in the balance position of the steelyard, and on the other hand it presses on one of the two stops when the balance is disturbed. The movable parts of the selectors 41 and 42 bear the sliding contacts 43 and 44 respectively which serve for connecting the contact points 45 and 46, and also 45 and 47 or the contact points 48 and 49 or also 48 and 50. The two selectors are so arranged that the greatest deflection of their sliding contacts 43 or 44 downwards or upwards, corresponds to the greatest turning moment acting on the system including the two steelyards 3 and 4 by reason of the loading of the weighing machine or outward moving of their travelling poises, whilst engagement of the sliding contacts 43 or 44 with the contact points 46 or 49 corresponds to a turning moment which can be balanced by moving the poise 8 of the units steelyard alone. Accordingly the connection of the contacts 45 and 46 or 48 and 49 serves for the actuation of the magnet 31 for putting in operation the units poise, and the connection of the contacts 45 and 47 or 48 and 50 for closing the circuit of the actuating magnet 32 of the tens poise. For this purpose it is immaterial whether magnets or solenoids are employed. The electric connections for the above mentioned contacts and corresponding magnets are given in the diagram Figure 5, any suitable source of continuous current being supplied to the mains indicated by the arrow heads.

The method of operation of the arrangement determines that the travelling poises 8 and 9 are moved forwards and backwards, that thus the screw spindles 16 and 17 and consequently also the motor 22, can turn in each of the two directions of rotation in such a manner that the direction of rotation corresponds to a movement of the travelling poises to the right, Figure 1, when the load arm 7 presses on the lower selector 41, and that the opposite direction of rotation or a rearward movement of the travelling poises to the left takes place when the load arm 7 presses on the upper selector 42. In order to effect this in the simplest manner, two phases of the polyphase current for the squirrel-cage or like motor are connected to the contacts 57 and 58, Figure 1, in such a manner that the motor 22 in the pressing down of the selector 41 and the contact spring 55 is connected for one direction of rotation, but when the selector 42 and its contact spring 56 is pressed up the motor is connected for the opposite direction of rotation.

The indication of weight of the loads automatically weighed by the weighing machine can be read off from both the scales of the steelyards 3 and 4. The terminals of the first or zero-notch and of the last notch of the notched bars 18 and 19 each have two contact points 51, 52 and 53, 54 respectively, which are connected together and with the actuating electromagnets 31 and 32 as shown in the diagram Figure 6. In this connection care should be taken that the contacts 51 and 52 of the notched bar 18 of the units steelyard 3 are connected to the actuating magnet 32 of the tens steelyard 4 and conversely the contacts 53 and 54 of the notched bar 19 of the tens steelyard 4 to the actuating magnet 31 of the steelyard 3. If now for example by a failure of the driving mechanism or by imperfect operation of one of the two selectors, the steelyard for the higher range of weights is prematurely set out of action and the lower range of weights is set in motion the tooth for the lower range of weights is brought on to the terminal contact of the notched bar, since the balance is not yet secured by the failure that has occurred in the higher range of weights. The tooth now closes the auxiliary circuit, which again sets the actuating magnet of the higher range in operation and by that means causes correct operation thereof notwithstanding the failure. For this purpose, the tooth is advantageously made of conducting material and enters between the two parts of the respective contact, thus making connection between these parts and thereby closing the circuit. The contacts 51 to 54 thus have for their object, by means of the currents in the auxiliary circuits closed thereby, that the latter, acting alternately and as required in order to produce balance, coordinate the functions of one travelling poise with those of the other.

The weighing device may comprise any desired number of steelyards of any desired range instead of two, the method of operation being analogous, to that described with two steelyards.

The method of operation of the automatic electric weighing apparatus is best illustrated by the following example:—When the machine is unloaded and the travelling poises stand on the zero points of their scales, the end of the lead arm 7 (assuming the weighing machine to be correctly tared) of the steelyard system in the position of balance will stand between the abutment pieces of the selectors 41 and 42, without touching them. In this position of the parts, the actuating magnets 31 and 32 are de-energized, since the circuit is interrupted at all the contacts.

Let it be assumed that the weighing machine is loaded with 86 kgs., the load arm 7 will exert a pressure corresponding to the load of more than 10 kgs., on the abutment piece of the lower selector 41, whereby the two sliding contacts 43 and 55 of the selector are moved downwards. In this position the sliding contact 55 closes the circuit at the contact 57 for two phases of the motor, whereby the motor turns in the direction in which the travelling poises are moved from the left to the right. In the first place merely the worm-wheels 25 and 26 and not the screw spindles 16 and 17 will turn; since at the same time the contact spring 43 is moved on the tens contact 45 and 47, the tens actuating magnet 32 is energized and attracts the tens actuating lever 30. By this means the corresponding clutch 28 is pressed into engagement with the worm wheel 26 and the screw spindle 17 for the carrier 11 of the tens poise is set in rotation which is now moved up to the notch "eighty" of the tens steelyard. Now the pressure of the load arm 7 on the lower selector 41 no longer corresponds to 10 but only to 6 kgs. Consequently the contact spring 43 is moved upwards, has left the tens contact 47 and now connects only the units contact 46 with 45. The tens actuating magnet 32 is de-energized by interrupting the circuit at the contacts 45 and 47 and the weight of the actuating lever effects the disengagement of the cone-clutch 28 and the bringing to rest of the tens screw spindle 17, which by means of the simultaneously excited brake magnet 40 is brought into the position which is required for the correct snapping of the carrier tooth 21 into the notched portion of the tens notched bar 19.

At the same time however the units actuating magnet 31 is energized through the contacts 35 and 36, the actuating lever 29 is attracted, the cone clutch 27 is thrown into engagement, the units screw spindle 16 is set in rotation, and consequently the adjusting device 10 and units poise 8 of the units steelyard 3 are moved towards the right. As soon as the knife-edge of the poise 8 has reached notch No. 6 of the scale of the units poise, balance is obtained. The load arm exerts no pressure on the selector 43 and the contact spring 41 leaves the contacts 45 and 46. By this means the actuating magnet 31 is de-energized, releases the actuating lever 29, the corresponding clutch 27 is thrown out of engagement, the screw spindle 16 is brought to rest and is brought under the action of the now energized brake magnet 39. The weighing operation is completed; the load is now removed from the weighing machine, the two travelling poises which have been moved to the right, cause the load arm 7 to exert a pressure on the upper selector 42 corresponding to the load of 86 kgs., so that its contact spring 44 is brought onto the contacts 48 and 50 and therefore the screw spindle 17 is again set in rotation. Since however in the pressing up of the selector 42 by the contact spring 56 reversal of the phases of the motor 22 takes place, the motor and consequently also the screw-spindle 17 turn in the reverse direction to their previous direction of rotation and the travelling poise 9 is moved towards its zero point. When it has reached this, it has so far reduced the turning moment of the weight system that the contact spring 44 of the selector 42 comes on to the contacts 48 and 49 whereby the driving gear of the poise 9 is thrown out of operation, but that of the poise 8 comes into action in an analogous manner and effects the return of the poise 8 to its zero position. Balance is now obtained again, the circuits are interrupted at all contacts and the motion-mechanism of the travelling poises is at rest. A fresh weighing can then begin.

We claim as our invention:

1. In an automatic electric steelyard weighing machine the combination with a plurality of steelyards simultaneously acted upon by the load, and travelling poises, the scales of the said steelyard starting from zero and corresponding to different ranges of weight according to the weighing system used, of electric circuits, contacts therein, a drawing mechanism for the poises and testing device (selector) comprising a pressure balancing device which is inoperative in the position of equilibrium of the weighing mechanism and occupies a position of adjustment differing according to the magnitude of the load and which serves for the selective actuation of the said contacts, whereby the circuits for the movement of the several travelling poises are automatically controlled, 2. In an automatic electric steelyard weighing machine as specified in claim 1, the arrangement of a single electric motor whereby, according to the magnitude of the load, either a single travelling poise is adjusted, or for effecting successively rough and fine weighing a plurality of travelling poises are successively automatically adjusted.

In testimony whereof we have hereunto set our hands.

KORNELIUS SCHEMBER.
RUDOLF JOKSCH.